United States Patent [19]
Matsuo et al.

[11] Patent Number: 4,765,713

[45] Date of Patent: Aug. 23, 1988

[54] PLASTIC-CLAD LIGHT-TRANSMITTING FIBER

[75] Inventors: Masashi Matsuo; Yutaka Furukawa, both of Yokohama; Toshio Iwamoto, Tokyo; Shoichi Kawakami, Chiba, all of Japan

[73] Assignee: Asahi Glass Company, Ltd., Tokyo, Japan

[21] Appl. No.: 881,698

[22] Filed: Jul. 3, 1986

[30] Foreign Application Priority Data

Jul. 4, 1985 [JP] Japan .................................. 60-145858
Aug. 28, 1985 [JP] Japan .................................. 60-187443

[51] Int. Cl.$^4$ ................................................ G02B 6/16
[52] U.S. Cl. ................................ 350/96.34; 350/96.3; 428/375; 428/378
[58] Field of Search ........................... 350/96.34, 96.3; 428/375, 378, 391, 392

[56] References Cited

U.S. PATENT DOCUMENTS

| | | | |
|---|---|---|---|
| 4,431,264 | 2/1984 | Clarke | 350/96.34 |
| 4,642,265 | 2/1987 | Suzuki | 350/96.34 X |
| 4,660,927 | 4/1987 | Kondow et al. | 350/96.34 |

FOREIGN PATENT DOCUMENTS

| | | |
|---|---|---|
| 002759 | 4/1981 | European Pat. Off. . |
| 2017774 | 10/1979 | United Kingdom . |

*Primary Examiner*—John Lee
*Assistant Examiner*—Michael Menz
*Attorney, Agent, or Firm*—Oblon, Fisher, Spivak, McClelland & Maier

[57] ABSTRACT

A plastic-clad light-transmitting fiber having a high NA (numerical aperture) and low transmission loss, which consists essentially of a core of quartz glass or optical glass and a clad of organopolysiloxane, wherein the clad of organopolysiloxane is a cured body having 30% by weight or more of fluorine content, which is obtained by the curing reaction of a vinyl group-containing organofluoropolysiloxane and a hydrogen-containing fluorosilicone compound, and wherein the vinyl group-containing organofluorosiloxane is a copolymerized polysiloxane obtained from a hydrocarbon siloxane unit and a polyfluoroalkyl group-containing siloxane unit, with a ratio of copolymerization of hydrocarbon siloxane unit ranging from 20 to 75 mol %.

12 Claims, No Drawings

PLASTIC-CLAD LIGHT-TRANSMITTING FIBER

This invention relates to a plastic-clad light-transmitting fiber having a high NA (numerical aperture) and low trasmission loss. More particularly, it is concerned with a plastic-clad light-transmitting fiber which consists essentially of a core material and a clad of organopolysiloxane composed of a cured body of a particular fluorosiloxane and a hydrogen-containing fluorosilicone compound.

There has heretofore been known a plastic-clad light-transmitting fiber which consists essentially of a core of quartz glass or optical glass and a clad of organopolysiloxane. For example, with a view to improving the NA and oil-resistant property, Japanese unexamined patent publications No. 62206/1981, No. 204003/1984, No. 204004/1984, and so forth disclose light-transmitting fibers manufactured by coating and curing on a core material a cladding material having a low refractive index and the oil-repellent property, and composed of organofluoropolysiloxane containing therein the perfluoroalkyl group and hydrogen-containing polysiloxane.

From the researches and studies done by the present inventors, it has been found that, in a light-transmitting fiber made up of a core of quartz glass or optical glass and a clad of organofluoropolysiloxane, a high NA can be attained and the heat-resistant property and oil-resistant property can also be improved by increasing the fluorine content in the cladding material, but, on the other hand, simple increase in the fluorine content alone causes decrease in the strength of the cladding material, on account of which the transmission loss of the resulting light-transmitting fiber becomes prohibitive hence this cladding material is of no practical use.

For instance, in the case of methyltrifluoropropyl polysiloxane which has so far been best known as the organofluoropolysiloxane, when the compound is rendered to have high molecular weight in order to make it a cladding material of excellent mechanical strength, there would take place difficulty in applying the material onto the surface of the quartz glass or the optical glass as the core material. On the other hand, when the compound is copolymerized with dimethylsiloxane or the like, or it is used together with hydrogen-containing polysiloxane by introduction thereinto of the vinyl group, there would accompany decrease in the fluorine content in the cladding material as cured on the core material with the consequent difficulty in attaining the high rate of NA (number of aperture).

There also exists a problem such that, since organofluoropolysiloxane and hydrogen-containing polysiloxane has no satisfactory compatibility with each other, the combination of both compounds bring about segregation during the curing process under the normal heat-curing conditions in the formation of the clad layer by coating the cladding material onto the surface of the core material, and then heating the same to cure, as the result of which the curing of the cladding material becomes so poor as to produce an inhomogeneous deposit, thereby increasing the loss in transmission of light.

In particular, with a view to increasing the fluorine content, when a polysiloxane containing therein the perfluoroalkyl group having a large number of carbon atoms like $C_4F_9$— is used as the organofluoropolysiloxane, the strength of the cladding material lowers to a remarkable extent, on account of which the loss in the light transmission becomes considerably large to thereby make the cladding material practically unusable, and other difficulties. In the case of the organofluoropolysiloxane containing therein the perfluoroalkyl group having a large number of carbon atoms, when the vinyl group is introduced into this compound so as to be used together with hydrogen-containing polysiloxane, the required high fluorine content can be attained, although it is difficult to obtain the cladding material excellent in its mechanical strength and pliability.

The present invention has been made with a view to solving the above-mentioned points of problem, and aims at providing a plastic-clad light-transmitting fiber satisfying both high NA and low transmission loss by taking good advantage of the organofluoropolysiloxane having primarily excellent heat-resistant property and oil-resistant property.

In more detail, the present invention is to provide a novel plastic-clad light-transmitting fiber consisting essentially of a core of quartz glass or optical glass and a clad of organopolysiloxane, wherein the clad of organopolysiloxane is a cured body having 30% by weight or more of the fluorine content, which is obtained by the curing reaction of a vinyl group-containing organofluoropolysiloxane and a hydrogen-containing fluorosilicone compound, and wherein the vinyl group-containing organofluoropolysiloxane is a copolymerized polysiloxane obtained from a hydrocarbon siloxane unit and a polyfluoroalkyl group-containing siloxane unit, with a ratio of copolymerization of the hydrocarbon siloxane unit ranging from 20 to 75 mol %.

In the present invention, it is important that the cladding material is a cured body of a particular organofluoropolysiloxane with the fluorine content of 30% by weight or more, or preferably in a range of from 40 to 60% by weight. When the fluorine content is low, the high NA becomes hardly attainable, the actual value of NA not reaching 0.5. It is also important that such particular cured body is resulted from the curing reaction of the vinyl group-containing organofluoropolysiloxane and the hydrogen-containing fluorosilicone compound.

The vinyl group-containing organofluoropolysiloxane contains therein the fluorosiloxane unit to be represented by

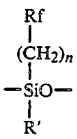

as the principal constituent, and further another unit having an unsaturated bond necessary for the curing. In the above formula, Rf represents a perfluoroalkyl group or a perfluoroalkyl ether group; R' denotes an alkyl group; and n is an integer of 2.

As the unit having the unsaturated bond necessary for the curing, there may be exemplified the vinyl group-containing siloxane unit to be represented by the following formula:

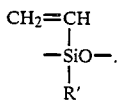

Preferred examples of such vinyl group-containing siloxane unit are: methylvinylsiloxane, divinylsiloxane, and so on. Such vinyl group-containing siloxane unit should preferably be contained in the fluoropolysiloxane at a ratio of from 0.5 to 5 mol %.

As the above-mentioned vinyl group-containing organofluoropolysiloxane to constitute the particular cladding material for the cured body of the present invention, it is important for attaining the high fluorine content and the high NA to adopt the polyfluoroalkyl group-containing siloxane unit, more particularly, a polymer of siloxane containing therein the perfluoroalkyl group having a large number of carbon atoms; it is also important for attaining high strength and low transmission loss to copolymerize the hydrocarbon siloxane such as dimethyl siloxane therewith to obtain a sufficient degree of polymerization. In more detail, such particular vinyl group-containing organofluoropolysiloxane is the copolymerized polysiloxane of the hydrocarbon siloxane unit and the polyfluoroalkyl group-containing siloxane unit, which has sufficient degree of polymerization with the total number of both siloxane units of 80 or more, or preferably 100 or more. When the degree of polymerization of the particular vinyl group-containing organofluoropolysiloxane is too low, it becomes difficult to obtain the cured clad body with sufficient rubber elasticity with the consequent loss of transmission in the light-transmitting fiber; in particular, loss in the micro-bending. While there is no upper limit to the degree of polymerization, if it is too large, the viscosity of the resin increases remarkably to make it difficult to obtain a uniform coating.

A ratio of copolymerization of the hydrocarbon siloxane unit in the above-mentioned particular copolymerized polysiloxane may be appropriately selected depending on the kind of the copolymerizing components (in particular, the kind of the polyfluoroalkyl group-containing siloxane unit), a desired fluorine content in the cured clad body as intended by the present invention, a desired degree of polymerization as mentioned above, and so on. In the case of a copolymer of the hydrocarbon siloxane with the particularly preferred siloxane having a polyfluoroalkyl group containing a large number of carbon atoms (e.g., $C_4F_9CH_2CH_2$ group-containing siloxane), the hydrocarbon siloxane should be in a range of from 20 to 75 mol %, or more preferably from 35 to 70 mol %, based on the total mol number of both siloxane units. When the ratio of copolymerization of the hydrocarbon siloxane unit is too high, attainment of the high NA becomes difficult owing to decrease in the fluorine content in the cured clad body; on the other hand, when the ratio is too low, the strength of the cured clad body decrease due to decrease in the degree of polymerization of the particular copolymerized polysiloxane with the consequent difficulty in attaining the low transmission loss.

In the next place, it is important for the above-mentioned particular copolymerized polysiloxane to contain therein the vinyl groups in order that it reacts with the hydrogen-containing fluorosilicone compound for curing. It is usually adopted in the form, in which both ends are closed with the dimethyl vinyl silyl group, and so forth. Or, it is also possible that, as a part of the hydrocarbon siloxane unit, there may be employed a compound such as $CH_2=CHSi(CH_3)Cl_2$ to synthesize the particular copolymerized polysiloxane to thereby introduce the vinyl group into the polysiloxane chain. In the present invention, an organofluoropolysiloxane containing therein the terminal vinyl group may be suitably adopted as the particular copolymerized polysiloxane. As the preferred example of the particular vinyl group-containing organofluoropolysiloxane, there may be a copolymerized polysiloxane, both terminals of which are closed with dimethyl vinyl silyl groups to be represented by the following formula:

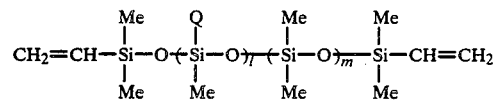

wherein Q represents a polyfluoroalkyl group which may contain therein an ether bond; Me denotes methyl group; $m/l$ is a ratio in a range of from 0.54 to 3; and $m+l$ is a total number of units of 80 or more.

Another preferred example of the particular vinyl group-containing organofluoropolysiloxane may be a copolymerized polysiloxane to be represented by the following formula:

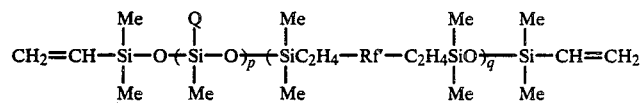

wherein Q represents a polyfluoroalkyl group which may contain therein an ether bond; Me denotes methyl group; Rf' designates a perfluoroalkylene group which may contain the ether bond; $q/p$ is a ratio in a range of from 1 to 2; and $q+p$ is a total number of units of 80 or more.

From the standpoint of achieving the high fluorine content relative to the high NA of 0.5 and above, it is particularly desirable in the present invention to adopt the polyfluoroalkyl group having the perfluoroalkyl group of high carbon content as Q in the above-mentioned equation, more concretely Rf—R— wherein Rf represents a perfluoroalkyl groups having 2 to 10 carbon atoms, and R denotes an alkylene group, both Rf and R being able to contain the ether bond, and so forth. For Rf, the perfluoroalkyl group containing therein four to nine carbon atoms (in particular, $CF_3CF_2CF_2CF_2$—) is suitable, and, for R, the alkylene group (in particular, —$CH_2CH_2$—) is appropriate. Also, both $m/l$ and $q/p$ should appropriately be 1 to 2 or so, and $(m+l)$ and $(q+p)$ should preferably be 100 or above.

Further, such particular vinyl group-containing organofluoropolysiloxane may be a copolymer with other siloxane unit which contains therein the vinyl group-containing siloxane unit at a ratio of 30% by weight, or more preferably 50% by weight or higher. Examples of such other siloxane unit are: non-fluorinated siloxane such as dimethyl siloxane, methylvinyl siloxane, and so forth; fluorinated siloxane such as 3,3,3-trifluoropropyl siloxane, and so on.

When the above-mentioned vinyl group-containing organopolysiloxane is made the principal constituent, the hydrogen-containing fluorosilicone compound acts as the curing agent. Therefore, the hydrogen-containing fluorosilicone compound as used in the present invention is one that contains in its molecules the radical Si—H, which can be represented by the following general formula:

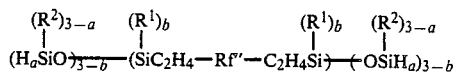

wherein Rf'' denotes a perfluoroalkylene group which may contain therein an ether bond; $R^1$ and $R^2$ represent respectively an alkyl group, or preferably a lower alkyl group or a fluoroalkyl group; and a is an integer of 1 to 3 and b is an integer of 0 or 1. As Rf'', there may be mentioned a perfluoroalkylene group of the formula $-(CF_2)_w-$ or an oxyperfluoroalkylene group of the formula

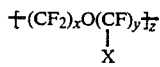

wherein in X represents F ro $CF_3$; w is an integer or 1 to 24; and each of x, y and z is an integer of 1 to 5. Representative examples of such hydrogen-containing fluorosilicone compound are as follows:

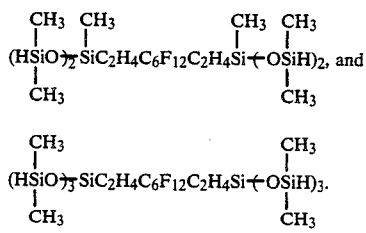

The hydrogen-containing fluorosilicone compounds can be synthesized through the following process, as an example:

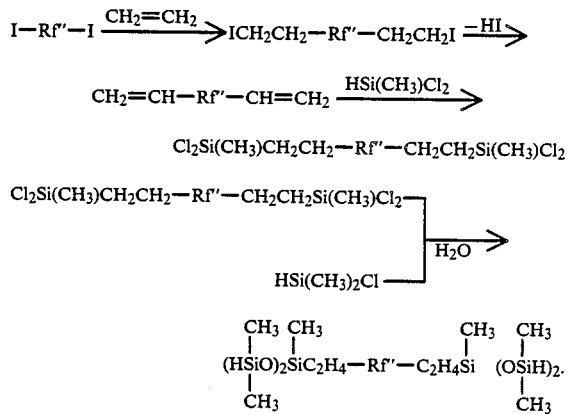

Viscosity of the hydrogen-containing fluorosilicone compound as the curing agent should preferably be 1,000 cps or below. Over 1,000 cps of its viscosity, the mixing of the curing agent with the principal ingredient becomes difficult by the ordinary method. Also, the fluorine content in the hydrogen-containing fluorosilicone compound should preferably be 30% by weight or above. Within this range, the uniform mixing between the curing agent and the principal ingredient can be done with extreme easiness.

The cladding material according to the present invention is subjected to the curing reaction between the vinyl group-containing organofluoropolysiloxane compound and the hydrogen-containing fluorosilicone compound to form a particular cured body. In this curing reaction, the ratio between the vinyl group-containing organofluoropolysiloxane and the hydrogen-containing fluorosilicone compound may be optionally selected. However, a preferred ratio of the H—Si— group in the curing agent is 1.2 to 2 mol relative to 1 mol of the $CH_2=CH—Si—$ group in the principal ingredient. If the H—Si— group in the curing agent is less than this range, the curing of the resulting product becomes insufficient in some cases; on the other hand, if it exceeds this range, the physical properties of the product after the curing becomes low in some cases.

The cladding material according to the present invention is in the form of transparent viscous liquid before it is cured, which can therefore be easily coated on the surface of silica fibers such as quarts glass or optical glass. This cladding material as cured in the form of a clad layer due to the heat-curing does in no way produce deposit of non-transparent substance. The reason for this is that the vinyl group-containing organofluoropolysiloxane as the principal ingredient and the hydrogen-containing fluorosilicone compound as the curing agent have high compatibility each other from their molecular structure, on account of which both compounds can be cured with high efficiency without being separated into two layers. As the consequence of this, there is no possibility of the cured clad layer becoming non-transparent, but there is formed a highly cured clad product.

It has been a general tendency that the conventional cladding material assumes non-transparent viscous liquid before it is cured, or, even if it is transparent, the resulting cured layer becomes non-transparent, because the principal ingredient and the curing agent in such conventional cladding material are essentially incompatible each other, hence both compounds are separated into two layers.

According to the present invention, the method of forming the clad layer onto the surface of the core composed of the quartz glass or the optical glass by the curing reaction of the cladding material is effected by first mixing the above-mentioned vinyl group-containing organofluoropolysiloxane, hydrogen-containing fluorosilicone compound, and a catalyst, then adding to this mixture an organic solvent, depending on necessity, to thereby prepare a composition of the cladding material and thereafter coating the thus prepared composition onto the surface of the core, followed by heating the coated clading material to cure. While there is no particular limitation to the method of coating the cladding material, use of the so-called "wire-drawing device" is usually preferred. Simultaneously with coating of the cladding material, its curing is effected by the heat-treatment. The conditions for such heat-treatment may be optionally determined in accordance with thickness of the clad layer to be formed. For instance, in order to obtain the clad layer of 100 micrometer thick by use of the above-mentioned wire-drawing device, a temperature of 400° C. and a heating time of two seconds are usually sufficient. For the purpose of curing the cladding material by such heat-treatment, it is necessary to add to the cladding material a small amount of a curing catalyst such as organic peroxides, platinum compounds, etc. In particular, the platinum compounds are preferable on account of their having the least coloring property. It may further be feasible to add a solvent, depending on necessity, to render the cladding material composition to have an appropriate viscosity for the coating process.

SYNTHETIC EXAMPLE 1

The vinyl group-containing fluoropolysiloxane (I) was synthesized in the following manner.

223.5 g of a 15% aqueous solution of sodium hydroxide was charged into a reactor. Then, a mixture composed of 50 g (0.138 mol) of $C_4F_9C_2H_4(CH_3)SiCl_2$ and 35.75 g (0.277 mol) of $(CH_3)_2SiCl_2$ was dropped into the aqueous solution in 60 minutes by maintaining the reaction temperature at 20° C. or below, while agitating the batch in the reactor.

After the dropping of the mixture liquid, agitation was further continued for 15 minutes at the same temperature level to extract an organic layer with trichlorotrifluoroethane. The extract liquid was washed with water and dried over magnesium sulfate, after which trichlorotrifluoroethane was fractionated from the extract liquid under a reduced pressure, thereby obtaining 55 g of colorless liquid as the product.

55 g of this product was put in the reactor together with 0.57 g of

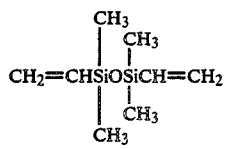

and 0.55 g of a 1% methanol solution of $(CH_3)_4N^+OH^-$, and then the batch was heated under a reduced pressure of 2 mm Hg and at a temperature ranging from 80 to 100° C. to continue the reaction for two hours, while agitating the mixture. After the reaction, the temperature within the reactor was elevated to 150° C., while maintaining the reduced pressure of 2 mm Hg, to remove by decomposition $(CH_3)_4N^+OH^-$ as the catalyst, from which 53 g of colorless transparent liquid was obtained as the end product.

As the results of analyses by the nuclear magnetic resonance (NMR) spectrum and the infrared ray spectrum, the thus obtained product was verified to be the vinyl group-containing fluoropolysiloxane, which is represented by the following formula, with $n_D^{25} = 1.364$ and viscosity = 5,000 cps.

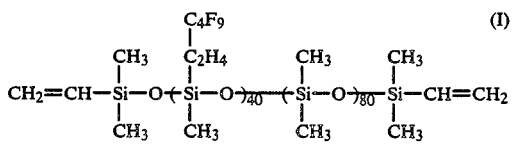

SYNTHETIC EXAMPLE 2

The vinyl group-containing fluoropolysiloxane (II) was synthesized in the following manner.

In the same method as in the above Synthetic Example 1 with the exception that $C_4F_9C_2H_4(CH_3)SiCl_2$ used in the above Synthetic Example 1 was replaced by $C_9F_{19}C_2H_4(CH_3)_2SiCl_2$ (with the same molar ratio as above), the vinyl group-containing fluoropolysiloxane to be represented by the following general formula was obtained.

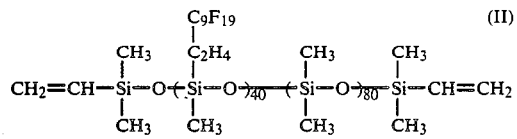

SYNTHETIC EXAMPLE 3

The vinyl group-containing fluoropolysiloxane (III) was synthesized in the following manner.

620 g of a 5% aqueous solution of $NaHCO_3$ was charged into a reactor, and then a solution prepared by dissolving 98.2 g of

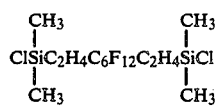

into 200 g of diethylether was dropped into the charge in the reactor, while agitating the batch and maintaining the temperature within the reactor at 10° C. or below. After the dropping of the solution, agitation was further continued for 30 minutes to separate an organic layer, which was then dried over magnesium sulfate.

Subsequently, 131 g of $C_4F_9C_2H_4(CH_3)SiCl_2$ was charged into a separate reactor, to which the ether solution obtained by the above-mentioned reaction was dropped at a room temperature. After the dropping of the ether solution, ether was removed by fractionation. Successively, the temperature in the reactor was elevated to 60° C. to continue the reaction under agitation for ten hours. The thus obtained reaction product was dissolved into trichlorotrifluoroethane, followed by washing the same with a 5% aqueous solution $NaHCO_3$ and water respectively, drying the organic layer over magnesium sulfate, and removing trichlorotrifluoroethane by fractionation, from which 200 g of colorless liquid was obtained.

200 g of the thus obtained colorless liquid product was charged into a reactor together with 0.2 g of

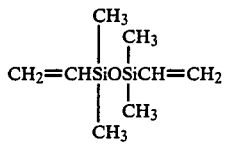

and 2.2 g of a 1% methanol solution of $(CH_3)_4N^+OH^-$, and the batch was reacted for two hours, under agitation, at a temperature of from 80° to 100° C. and a reduced pressure of 2 mm Hg. After the reaction, the temperature within the reactor was raised to 150° C., and the low boiling point substance and $(CH_3)_4N^+OH^-$ were removed by decomposition under reduced pressure of 2 mm Hg, thereby obtaining 155 g of colorless liquid as the end product.

As the results of analyses by the nuclear magnetic resonance (NMR) spectrum and the infrared ray spectrum, the resultant product was verified to be the vinyl group-containing fluoropolysiloxane, which is represented by the following formula, with $n_D^{25} = 1.38$ and viscosity = 5,000 cps.

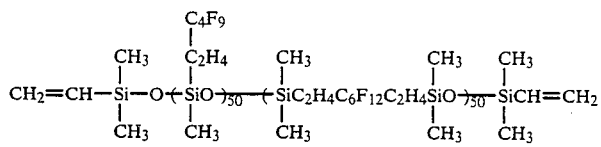

SYNTHETIC EXAMPLE 4

The hydrogen-containing fluorosilicone compound (IV) was synthesized in the following manner.

1,000 ml of water was put in a reactor, and then a homogeneous solution prepared by dissolving 200 g (0.36 mol) of $Cl_2(CH_3)SiC_2H_4C_6F_{12}C_2H_4Si(CH_3)Cl_2$ and 345.1 g (3.65 mol) of $H(CH_3)_2SiCl$ into 500 ml of trichlorotrifluoroethane was dropped under agitation and while maintaining the reaction temperature in a range of from 30° to 40° C.

After the dropping of the solution, the agitation was further continued for 12 hours at a room temperature to extract an organic layer with trichlorotrifluoroethane. The extract liquid was then washed with a 5% aqueous solution of $NaHCO_3$ and saline water, followed by drying the same over magnesium sulfate. Subsequently, trichlorotrifluoroethane was removed by fractionation under a reduced pressure, and the residual liquid was further distilled under a reduced pressure to thereby obtain 268.2 g of colorless transparent liquid (at a rate of yield of 60%). Through the nuclear magnetic resonance (NMR) spectrum analysis and the infrared ray spectrum analysis, the substance constituting the liquid was verified to be the hydrogen-containing fluorosilicone compound (having a boiling point of from 170° to 171° C./3 mm Hg) which is represented by the following formula.

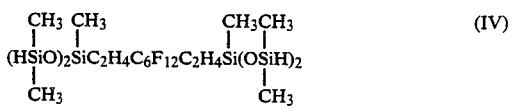

SYNTHETIC EXAMPLE 5

The hydrogen-containing fluorosilicone compounds (V), (VI) and (VII) were synthesized in the following manner.

With the exception that $Cl_2(CH_3)SiC_2H_4C_6F_{12}C_2H_4Si(CH_3)Cl_2$ as used in Synthetic Example 4 above was replaced by the following respective compounds of:

$Cl_2(CH_3)SiC_2H_4C_2F_4C_2H_4Si(CH_3)Cl_2$, $Cl_2(CH_3)SiC_2H_4C_8F_{16}C_2H_4Si(CH_3)Cl_2$ and $Cl_3SiC_2H_4C_6F_{12}C_2H_4SiCl_3$ (provided that the quantity of the compound used was 0.24 mol), the same reaction as in Synthetic Example 4 above was carried out, whereby the hydrogen-containing fluorosilicone compounds to be represented by the following formulae were obtained.

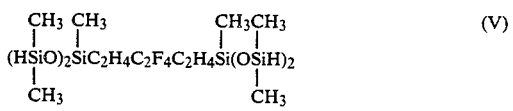

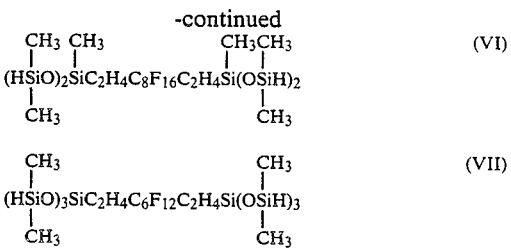

EXAMPLE 1

A composition prepared by mixing 100 g of the vinyl group-containing fluoropolysiloxane (I) as obtained in Synthetic Example 1 above, 4 g of the hydrogen-containing fluorosilicone compound (IV) obtained in Synthetic Example 4 above, and 0.52 g of a 0.2% isopropanol solution of chloroplatinic acid was coated on the outer peripheral surface of a quartz glass fiber having an outer diameter of 200 microns in such a manner that thickness of the coated layer may be 100 microns. Subsequently, the coated quartz glass fiber was introduced into a heat-curing furnace maintained at a temperature of 400° C., through which it was caused to pass in two seconds, thereby obtaining a plastic-clad light-transmitting fiber with the clad layer of fluoropolysiloxane having been formed on the outer peripheral surface of the quartz glass fiber.

Measurements of the properties of the thus obtained light-transmitting fiber revealed that it had a NA of 0.5 and a transmission loss of 10 dB/km (850 nm). For the purpose of testing its heat-resistant property, the plastic-clad light-transmitting fiber was kept at 150° C. for 200 hours, but no change in its properties could be recognized. Further, the plastic-clad fiber was lapped with a radius of curvature of 3 mm to find out cracks, exfoliation, etc. of the clad layer, but no such occurrence could be recognized. Hardness of the clad as measured by the Shore A Hardness Meter indicated a value of 30.

EXAMPLES 2 to 7

By use of the vinyl group-containing fluoropolysiloxane (I, (II) and (III) as obtained in Synthetic Examples 1 to 3 above and the hydrogen-containing fluorosilicone compounds (IV), (V), (VI) and (VII) as obtained in Synthetic Examples 4 and 5, various compositions for the clad layer as shown in Table 1 below were prepared in the same manner as in Example 1 above.

These compositions were each coated on the outer peripheral surface of the quartz glass fiber and cured by heat-treatment to thereby obtain the plastic-clad light-transmitting fibers with a clad layer.

The properties of the thus obtained light-transmitting fibers were measured in the same manner as in Example 1 above, the results of which are as shown in Table 1 below. Further, the results of the heat-resistant and the lapping tests also revealed no change at all as in the case of Example 1 above.

TABLE 1

| No. | Composition of clad layer | | Properties of light transmitting fiber | |
|---|---|---|---|---|
| | Vinyl group-containing fluoropolysiloxane | Hydrogen containing fluorosilicone | NA | Transmission loss |
| EX. 2 | (I) of Synthetic Example 1 | (V) of Synthetic Example 5 | 0.5 | 10 dB/km |
| EX. 3 | (I) of Synthetic Example 1 | (VI) of Synthetic Example 5 | 0.5 | 10 dB/km |
| EX. 4 | (I) of Synthetic Example 1 | (VII) of Synthetic Example 5 | 0.5 | 10 dB/km |
| EX. 5 | (II) of Synthetic Example 2 | (IV) of Synthetic Example 4 | 0.5 | 10 dB/km |
| EX. 6 | (II) of Synthetic Example 2 | (VII) of Synthetic Example 5 | 0.5 | 10 dB/km |
| EX. 7 | (III) of Synthetic Example 3 | (IV) of Synthetic Example 4 | 0.5 | 10 dB/km |

COMPARATIVE EXAMPLE

In the same manner as in Example 1 above, the cladding composition was prepared with the exception that the hydrogen-containing fluorosilicone compound used in Example 1 was replaced by a compound to be represented by the following formula:

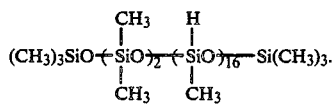

The thus prepared cladding composition was coated on the outer peripheral surface of a quartz glass fiber, followed by curing the same, whereby the plastic-clad light-transmitting fiber with the clad layer having been formed on it was obtained. The clad layer of this plastic-clad light-transmitting fiber was not completely cured, but had a certain degree of stickiness. The properties of this light-transmitting fiber indicated a NA of 0.5 and a transmission loss of 50 dB/km.

The feature of the plastic-clad light-transmitting fiber according to the present invention resides in that the clad layer consists of a cured body of the vinyl group-containing fluoropolysiloxane and the hydrogen-containing fluorosilicone compound, both substances being excellent in their compatibility and therefore bringing about the effect of improving the properties of the clad to be formed, including, of course, its strength.

EXAMPLE 8

The vinyl group-containinig fluoropolysiloxane (I) was synthesized in the following manner.

223.5 g of a 15% aqueous solution of sodium hydroxide was charged into a reactor. Then, a mixture composed of 50 g (0.138 mol) of $C_4F_9C_2H_4(CH_3)SiCl_2$ and 35.75 g (0.277 mol) of $(CH_3)_2SiCl_2$ was dropped into the aqueous solution in 60 minutes by maintaining the reaction temperature at 20° C. or below, while agitating the batch in the reactor.

After the dropping of the mixture liquid, agitation was further continued for 15 minutes at the same temperature level to extract an organic layer with trichlorotrifluoroethane. The extract liquid was washed with water and dried over magnesium sulfate, after which trichlorotrifluoroethane was fractionated from the extract liquid under a reduced pressure, thereby obtaining 55 g of colorless liquid as the product.

55 g of this product was put in the reactor together with 0.57 g of

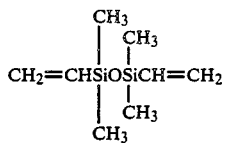

and 0.55 g of a 1% methanol solution of $(CH_3)_4N^+OH^-$, and then the batch was heated under a reduced pressure of 2 mm Hg and at a temperature ranging from 80° to 100° C. to continue the reaction for two hours, while agitating the mixture. After the reaction, the temperatuer within the reactor was elevated to 150° C., while maintaining the reduced pressure of 2 mm Hg, to remove by decomposition $(CH_3)_4N^+OH^-$ as the catalyst, from which 53 g of colorless transparent liquid was obtained as the end product.

As the results of analyses by the nuclear magnetic resonance (NMR) spectrum and the infrared ray spectrum, the thus obtained product was verified to be the vinyl group-containing fluoropolysiloxane, which is represented by the following formula, with $n_D^{25^\circ} = 1.364$ and viscosity = 5,000 cps.

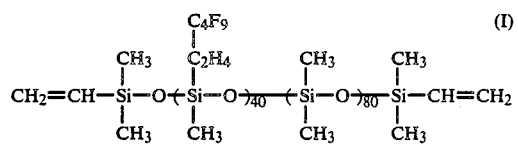

Then, a composition prepared by mixing 100 g of the above vinyl group-containing fluoropolysiloxane (I), 1.87 g of the hydrogen-containing fluorosilicone compound of the following formula:

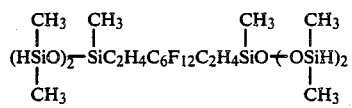

and 0.50 g of a 0.2% propanol solution of chloroplatinic acid was coated on the outer peripheral surface of a quartz glass fiber having an outer diameter of 200 microns in such a manner that thickness of the coated layer may be 100 microns. Subsequently, the coated quartz glass fiber was introduced into a heat-curing furnace maintained at a temperature of 400° C., through which it was caused to pass in two seconds, thereby obtaining a light-transmitting fiber with the plastic-clad layer of fluoropolysiloxane having been formed on the outer peripheral surface of the quartz glass fiber.

Measurements of the properties of the thus obtained light-transmitting fiber revealed that it had a NA of 0.52 and a transmission loss of 4 dB/km (850 nm). For the purpose of testing its heat-resistant property, the plastic-clad light-transmitting fiber was kept at 150° C. for 200 hours, but no change in its properties could be recognized.

EXAMPLE 9

In the same method as in Example 8 with the exception that $C_4F_9C_2H_4(CH_3)SiCl_2$ used in Example 8 was replaced by $C_9F_{19}C_2H_4(CH_3)SiCl_2$ (with the same molar ratio as above), a vinyl group-containing fluoropolysiloxane to be represented by the following general formula was obtained.

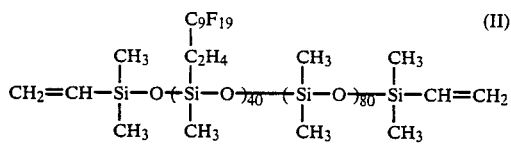

Then, in the same method as in Example 8, a composition prepared by mixing the above compound and the hydrogen-containing fluorosilicone compound was coated on the outer peripheral surface of a quartz glass fiber, followed by heat-curing to obtain a light-transmitting fiber with a plastic-clad layer formed thereon.

The light-transmitting fiber thus obtained had a NA of 0.58 and a transmission loss of 5 dB/km. No change was observed by the heat resistance test.

EXAMPLE 10 AND 11

Light-transmitting fibers with plastic-clad layers formed thereon were prepared in the same method as in Example 8 except that the molar ratio of $C_4F_9C_2H_4(CH_3)SiCl_2$ to $(CH_3)_2SiCl_2$ was changed as shown in Table 2.

The results of the physical property measurements of the light-transmitting fibers are shown in Table 2.

COMPARATIVE EXAMPLES 2 AND 3

Light-transmitting fibers with plastic-clad layers formed thereon were prepared in the same method as in Example 8 except that the molar ratio of $C_4F_9C_2H_4(CH_3)SiCl_2$ to $(CH_3)_2SiCl_2$ was changed as shown in Table 2.

The results of the physical property measurements of the light-transmitting fibers are shown in Table 2.

TABLE 2

| No. | Molar ratio of $C_4F_9C_2H_4(CH_3)SiCl_2$ : $(CH_3)_2SiCl_2$ | Properties NA | Properties Transmission loss (dB/km) | After heat resistance test NA | After heat resistance test Transmission loss (dB/km) |
|---|---|---|---|---|---|
| Example 10 | 1:1 | 0.55 | 4 | 0.55 | 4 |
| Example 11 | 1:3 | 0.50 | 4 | 0.50 | 4 |
| Comparative Example 2 | 1:4 | 0.45 | 4 | 0.45 | 4 |
| Comparative Example 3 | 2:1 | 0.58 | 25 | 0.58 | 25 |

The plastic-clad light-transmitting fiber according to the present invention has various characteristics such that, owing to its having a large difference in refractive index between the core and the clad, its numerical aperture (NA) increases, the conjugating efficiency between the light source and the light-transmitting fiber improves, and the light-receiving angle is also large. As the consequence of this, there accrues such effect that hydro coupling among the light transmitting fibers becomes facilitated, which accompanied difficulties in the conventional light-transmitting fibers owing to their small number of apertures. There are further effects such that, since the light-transmitting fiber according to the present invention has a small transmission loss, it is highly suited for transmission over a long distance, and, in addition, it has excellent heat-resistant property.

We claim:

1. A plastic-clad light-transmitting fiber consisting essentially of a core of quartz glass or optical glass and a clad of organopolysiloxane, said plastic-clad light-transmitting fiber being characterized in that said clad of organopolysiloxane is a cured body having 30% by weight or more of the fluorine content, which is obtained by curing reaction of a vinyl group-containing organofluoropolysiloxane and a hydrogen-containing fluorosilicone compound, and that the vinyl group-containing organofluoropolysiloxane is a copolymerized polysiloxane obtained from a hydrocarbon siloxane unit and a polyfluoroalkyl group-containing siloxane unit, with a ratio of copolymerization of said hydrocarbon siloxane unit ranging from 20 to 75 mol %, and wherein said vinyl group-containing organofluoropolysiloxane is an organofluoropolysiloxane containing the vinyl group at the terminal end thereof, said compound being represented by the following formula:

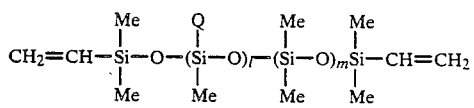

wherein Q represents a polyfluoroalkyl group which may contain therein an ether bond; Me denotes methyl group; m/l indicates a ratio of from 0.54 to 3; and m+l is the total unit number of the compounds of 80 or more.

2. The plastic-clad light-transmitting fiber according to claim 1, wherein said polyfluoroalkyl group represented by Q has a structure of Rf—R— wherein Rf designates a perfluoroalkyl group having two to ten carbon atoms; R denotes an alkylene group; and Rf and R may contain an ether bond.

3. A plastic-clad light-transmitting fiber consisting essentially of a core of quartz glass or optical glass and a clad of organopolysiloxane, said plastic-clad light-transmitting fiber being characterized in that said clad of organopolysiloxane is a cured body having 30% by weight or more of the fluorine content, which is obtained by the curing reaction of a vinyl group-containing organofluoropolysiloxane and a hydrogen-containing fluorosilicone compound, and that the vinyl group-containing organofluoropolysiloxane is a copolymerized polysiloxane obtained from a hydrocarbon siloxane unit and a polyfluoroalkyl group-containing siloxane unit, with a ratio of a copolymerization of said hydrocarbon siloxane unit ranging from 20 to 75 mol %, and wherein said vinyl group-containing organofluoropolysiloxane is an organofluoropolysiloxane containing the vinyl group at the terminal end thereof, said compound being represented by the following formula:

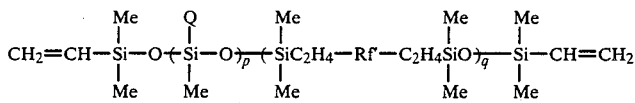

wherein Q represents a polyfluoroalkyl group which may contain therein an ether bond; Me denotes methyl group; Rf' designates a perfluoroalkylene group which may contain therein an ether bond; q/p is a ration in a range of from 1 to 2; and q+p is the total unit number of the compounds of 80 or more.

4. The plastic-clad light-transmitting fiber according to claim 3, wherein said polyfluoroalkyl group represented by Q has a structure of Rf—R— wherein Rf designates a perfluoroalkyl group having two to ten carbon atoms, R denotes an alkylene group; and Rf and R may contain therein an ether bond.

5. A plastic-clad light-transmitting fiber consisting essentially of a core of quartz glass or optical glass and a clad of organopolysiloxane, said plastic-clad light-transmitting fiber being characterized in that said clad of organopolysiloxane is a cured body having 30% by weight or more of the fluorine content, which is obtained by curing reaction of a vinyl group-containing organofluoropolysiloxane and a hydrogen-containing fluorosilicone compound, and that the vinyl group-containing organofluoropolysiloxane is a copolymerized polysiloxane obtained from a hydrocarbon siloxane unit and a polyfluoroalkyl group-containing siloxane unit, with a ratio of copolymerization of said hydrocarbon siloxane unit ranging from 20 to 75 mol %, and wherein said hydrogen-containing fluorosilicone compound is represented by the following general formula:

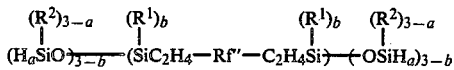

wherein Rf'' represents a perfluoroalkylene group which may contain therein an ether bond; $R^1$ and $R^2$ are an alkyl group or a fluoroalkyl group; and a is an integer of 1 to 3 and b is an integer of 0 or 1.

6. The plastic-clad light-transmitting fiber according to claim 5, wherein said hydrogen-containing fluorosilicone compound has its viscosity of 1,000 cps at 25° C. or below.

7. The plastic-clad light-transmitting fiber according to claim 5, wherein said hydrogen-containing fluorosilicon compound has its fluorine content of 30% by weight or more.

8. The plastic-clad light-transmitting fiber according to claim 1, wherein said curing reaction is catalyzed by a platinum compound.

9. The plastic-clad light-transmitting fiber according to claim 3, wherein said curing reaction is catalyzed by a platinum compound.

10. The plastic-clad light-transmitting fiber according to claim 5, wherein said curing reaction is catalyzed by a platinum compound.

11. The plastic-clad light-transmitting fiber according to claim 1, wherein said hydrogen-containing fluorosilicone compound is represented by the following general formula:

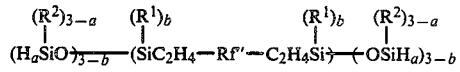

wherein Rf'' represents a perfluoroalkylene group which may contain therein an ether bond; $R^1$ and $R^2$ are an alkyl group or a fluoroalkyl group; and a is an integer of 1 to 3 and b is an integer of 0 or 1.

12. The plastic-clad light-transmitting fiber according to claim 3, wherein said hydrogen-containing fluorosilicone compound is represented by the following general formula:

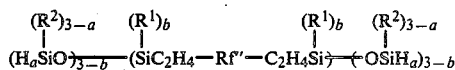

wherein Rf'' represents a perflouroalkylene group which may contain therein an ether bond; $R^1$ and $R^2$ are an alkyl group or a fluoroalkyl group; and a is an integer of 1 to 3 and b is an integer of 0 or 1.

* * * * *